Oct. 12, 1954  R. T. DE PAN  2,691,324
APPARATUS FOR REMOVING RAGS FROM STOCK PULPERS
Filed March 29, 1951  5 Sheets-Sheet 1
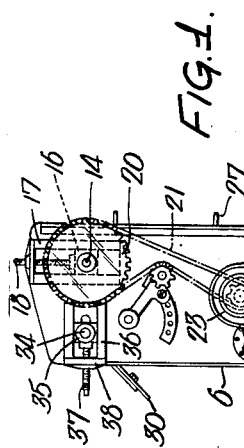
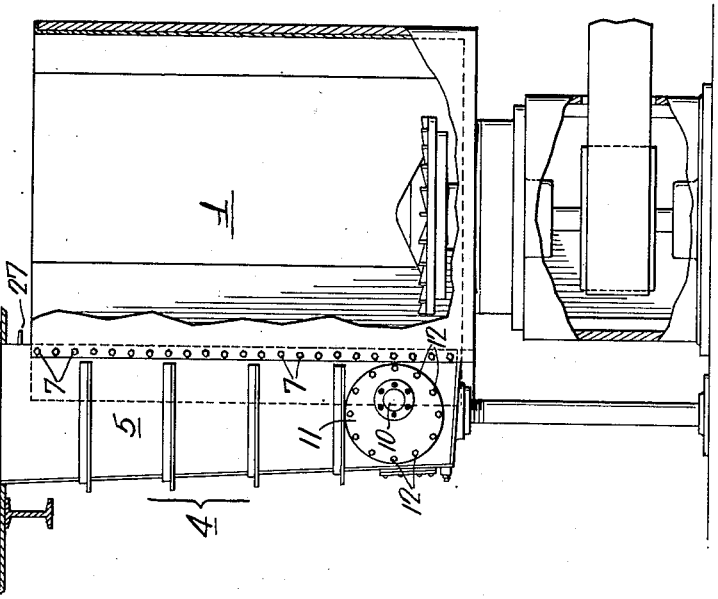
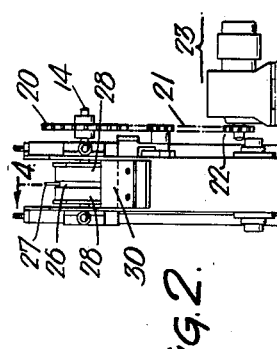
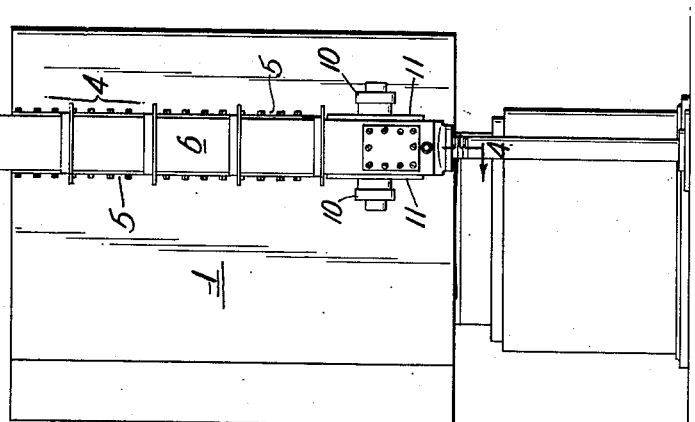
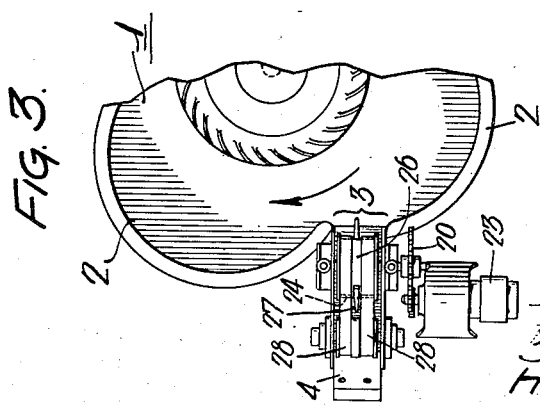
Inventor:
Raymond T. De Pan
by his Attorneys
Howson & Howson

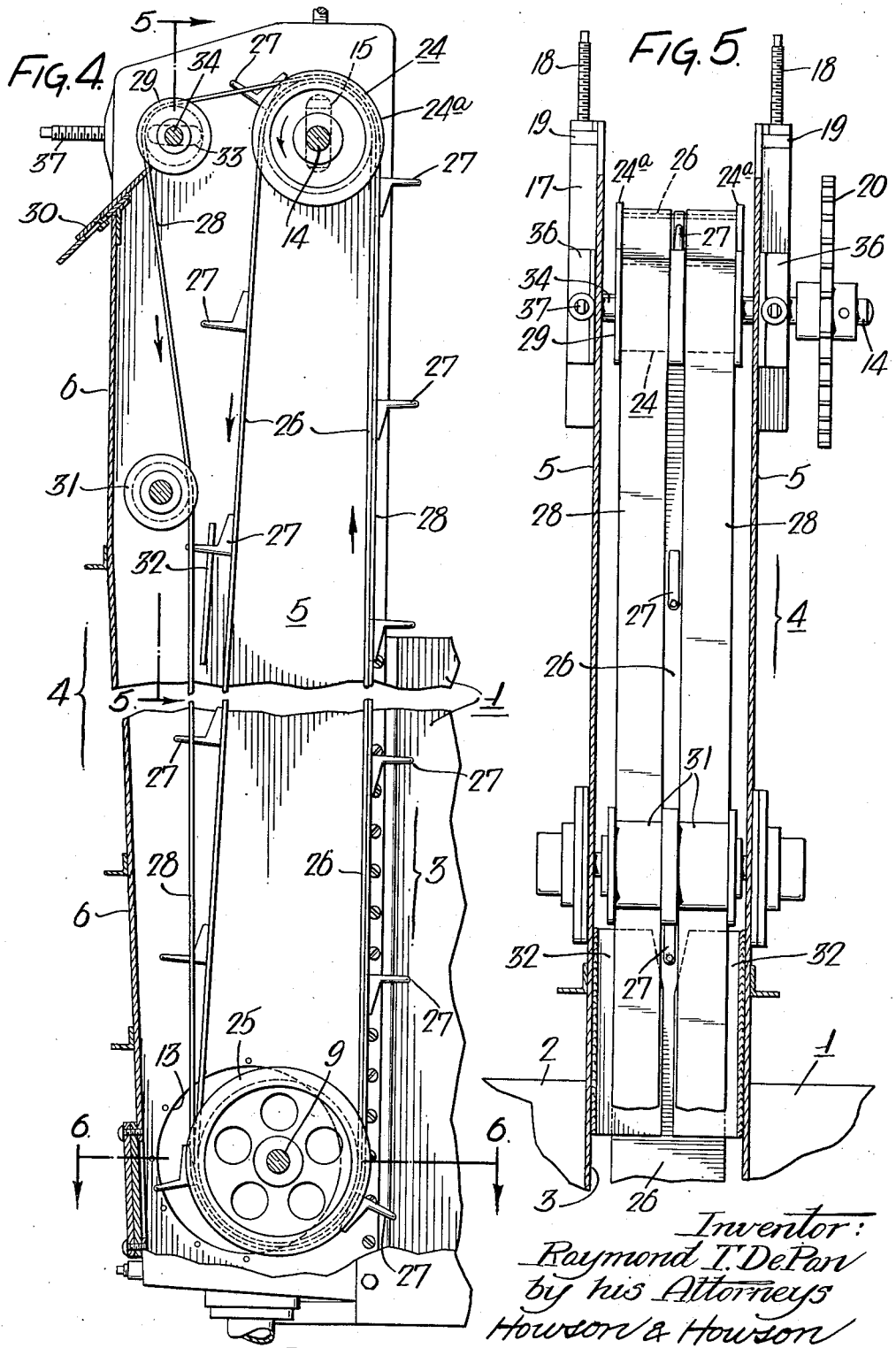

Oct. 12, 1954     R. T. DE PAN     2,691,324
APPARATUS FOR REMOVING RAGS FROM STOCK PULPERS
Filed March 29, 1951     5 Sheets-Sheet 3

Inventor:
Raymond T. DePan
by his Attorneys
Howson & Howson

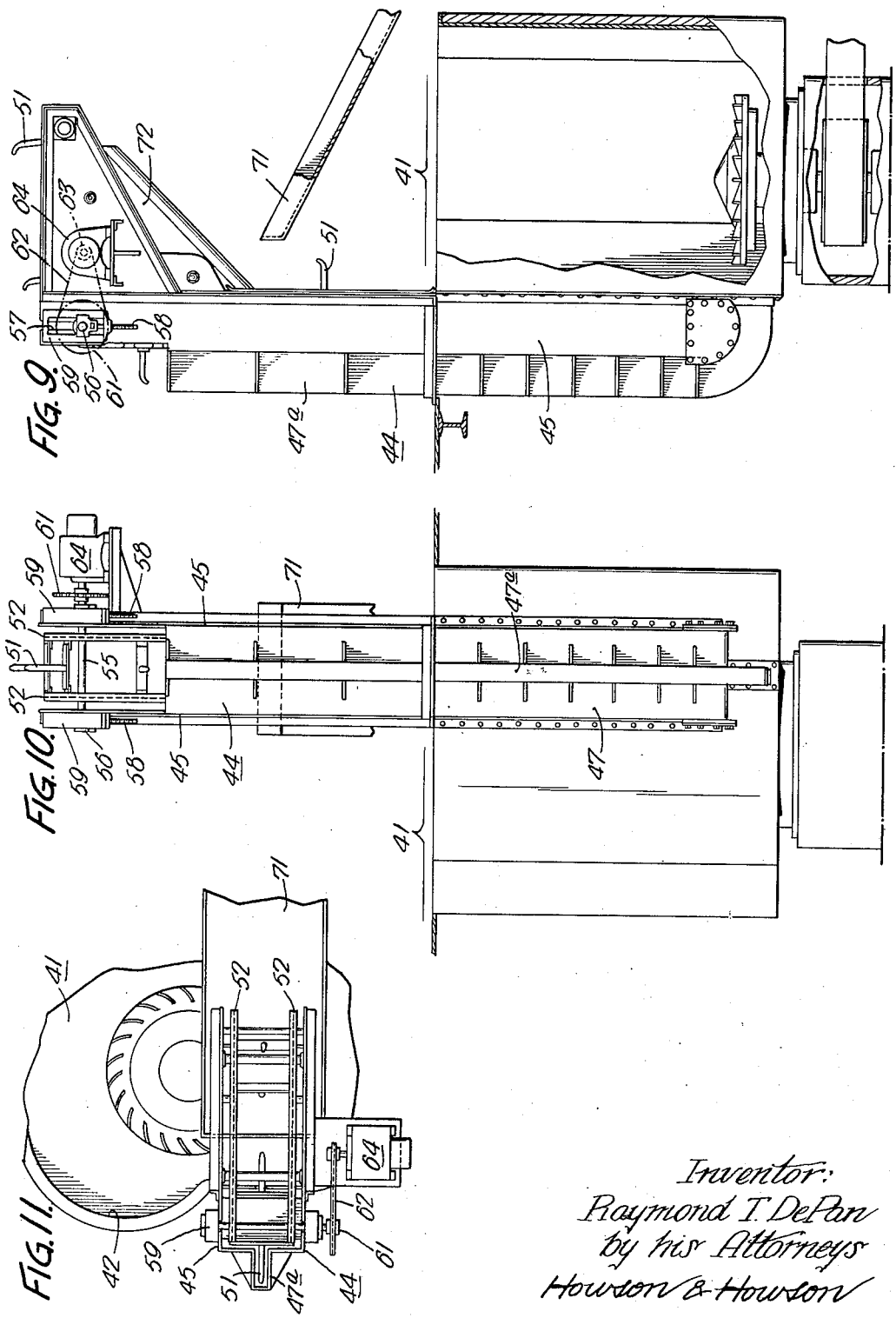

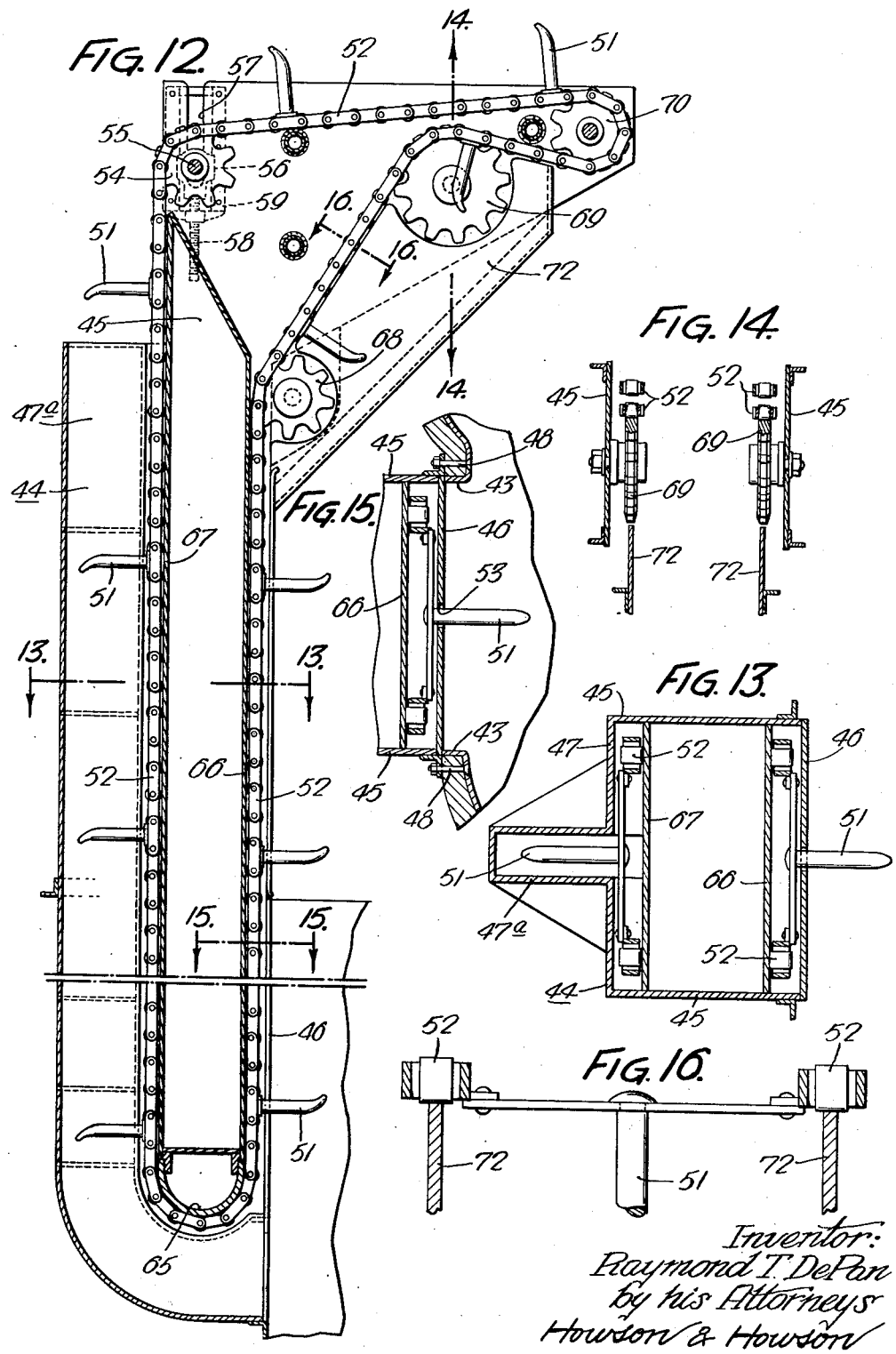

Patented Oct. 12, 1954

2,691,324

UNITED STATES PATENT OFFICE 2,691,324

APPARATUS FOR REMOVING RAGS FROM STOCK PULPERS

Raymond T. De Pan, West Chester, Pa., assignor to Downingtown Manufacturing Company, Downingtown, Pa., a corporation of Pennsylvania Application March 29, 1951, Serial No. 218,223

7 Claims. (Cl. 92—28)

This invention relates to new and useful improvements in pulping apparatus for treating fibrous material. More particularly the invention relates to apparatus for removing rags and similar trash from the paper stock being treated, and is especially adapted for use in conjunction with pulpers of the type shown and described in co-pending application Serial No. 74,996, filed February 7, 1949, for Apparatus for Treating Fibrous Material, now Patent No. 2,641,971. This application is a continuation-in-part of my co-pending application Serial No. 133,807, filed December 19, 1949, now abandoned.

In the continuous operation of paper stock pulpers and like machines, particularly in board mills where waste paper is the material to be de-fibred, it is desirable to provide for the continuous removal of rags and like trash which always are present in waste paper as supplied to the mill. The rag content of waste paper is considerable and unless it is removed continuously frequent shut-downs of the pulper are necessary.

With the foregoing in mind the principal object of the present invention is to provide novel means for removing undesired rags and similar trash from paper stock being treated in a pulper.

Another object of the invention is to provide novel rag removing means as set forth which is of relatively simplified and inexpensive construction yet is highly effective in operation and use.

These and other objects of the invention and the various features and details of the construction and operation thereof are hereinafter fully set forth and described with reference to the accompanying drawing, in which:

Fig. 1 is an elevational view, partially broken away, showing a side view of rag removing apparatus made according to the present invention;

Fig. 2 is another elevational view of the paper stock treating apparatus showing the rag removing apparatus from the rear thereof;

Fig. 3 is a fragmentary plan view of the stock treating apparatus and the rag removing device of the present invention;

Fig. 4 is an enlarged sectional view on line 4—4, Fig. 2;

Fig. 5 is an enlarged sectional view on line 5—5, Fig. 4;

Fig. 9 is a side elevational view partially in section illustrating another embodiment of the rag removing apparatus of the present invention in conjunction with paper stock treating apparatus;

Fig. 10 is a rear elevational view of the rag removing apparatus illustrated in Fig. 9;

Fig. 11 is a fragmentary plan view of the stock treating apparatus and rag removing device of the present invention;

Fig. 12 is an enlarged longitudinal sectional view of the embodiment illustrated in Figs. 9, 10 and 11;

Fig. 13 is an enlarged sectional view on line 13—13, Fig. 12;

Fig. 14 is an enlarged sectional view on line 14—14, Fig. 12;

Fig. 15 is an enlarged sectional view on line 15—15, Fig. 12; and

Fig. 16 is an enlarged sectional view on line 16—16, Fig. 12.

Figure 6:
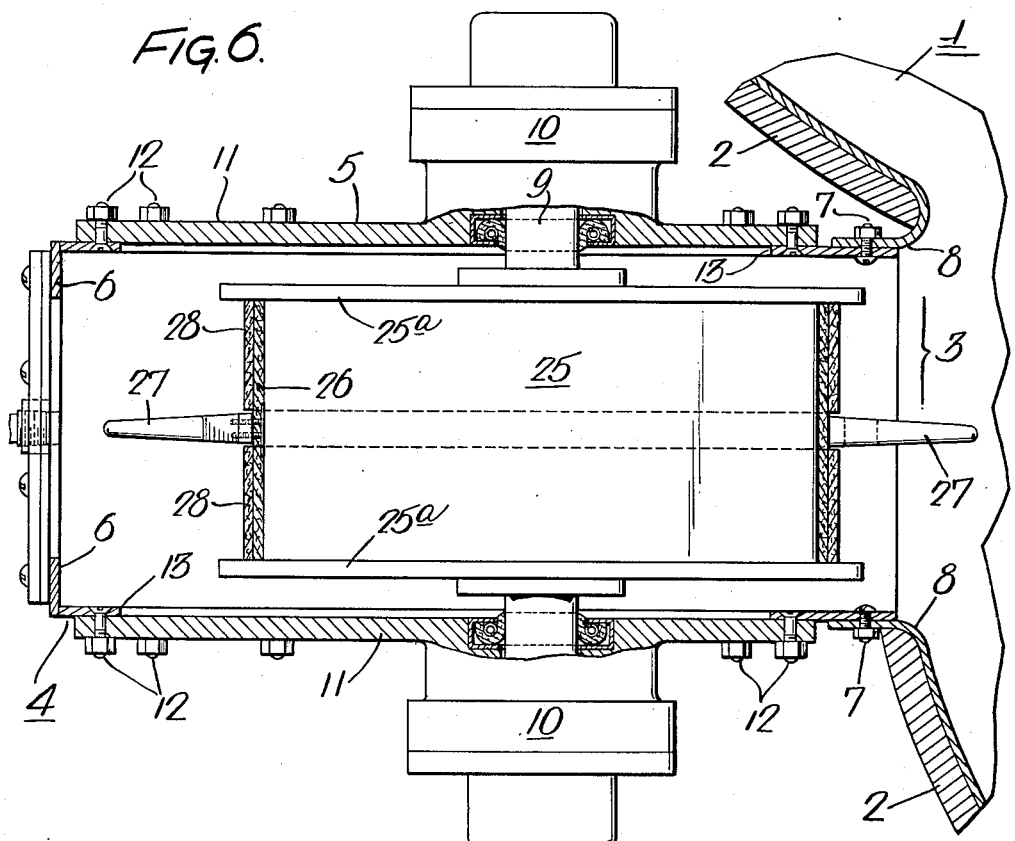
Fig. 6 is an enlarged sectional view on line 6—6, Fig. 4.

Referring now more particularly to the drawings, Figs. 1 to 8, inclusive, illustrate one form of the present invention shown in conjunction with paper stock treating apparatus of the type shown and described in the aforesaid patent application and comprising a tank 1 having its side walls constituted of a plurality of upwardly extending concave lobes 2 arranged uniformly about the axis of the tank 1, for example, as indicated in Fig. 3.

In accordance with the present invention, there is provided in the pulper tank 1 a vertical slot or opening 3 which extends entirely from the bottom of the tank to the top thereof and is located adjacent the junction between two adjacent lobes of the tank and in advance of said junction with respect to the general direction of flow of the paper stock being treated in the tank.

Secured outwardly adjacent the tank 1 and communicating with the interior thereof through the vertical opening 3 is a housing structure, generally designated 4, in which is contained the rag removing mechanism of the present invention. The housing 4 comprises vertically extending relatively spaced parallel side walls 5 and an outer or rear wall 6. The side walls 5 have their corresponding inner edges secured, as indicated at 7, to outturned portions 8 of the wall of the tank 1 at opposite sides of the vertical slot or opening 3 therein, and the outer edges of the side walls 5 are connected by the outer or rear wall 6 which serves to complete the housing 4 and provide a vertical enclosure for the mechanism outwardly adjacent the opening 3 in the tank 1.

Rotatably mounted transversely of the housing 4 adjacent the lower end thereof is a shaft 9 which has its opposite ends journaled in bearings 10. The bearings 10 are provided with enlarged flange portions 11 which are detachably secured to opposite sides of the housing 4, for example, by means of bolts 12. The flange portions 11 serve to cover relatively large circular holes or openings 13 provided in the side walls 5 of the housing 4 and which are provided to permit assembly of a pulley on the shaft 9 in the bottom of the housing.

Also mounted transversely of the housing 4 adjacent the upper end thereof is a shaft 14 which has its opposite ends projected laterally outward through vertical slots 15 in the housing side walls 5 and rotationally mounted in bearings 16. The bearings 16 are supported for vertical sliding movement by means of relatively spaced parallel guides 17 secured exteriorly of the housing side walls 5 and vertical adjustment of the bearings 16 in said guides 17 to adjust the position of the shaft 14 within the limits of the length of the slots 15 is accomplished by means of jack-screws 18 which are connected to the bearings 16 and threaded in cross-head members 19 that are secured to the upper ends of the guides 17, for example, as shown in Fig. 1 of the drawings.

The shaft 14 is adapted to be rotationally driven in the counterclockwise direction with respect to Fig. 4 of the drawings, and for this purpose there is secured on one end of the shaft 14 exteriorly of the housing 4 a sprocket wheel 20 which may be rotationally driven by means of a chain 21 from a smaller sprocket 22 on the shaft of an electric motor 23. Fixedly mounted upon the upper and lower shafts 14 and 19 are pulleys 24 and 25, respectively. These pulleys have circumferential surfaces of substantial width and are provided with retaining flanges 24a and 25a at opposite sides thereof respectively, for example, as shown in Figs. 5 and 6 of the drawings.

Figure 7:
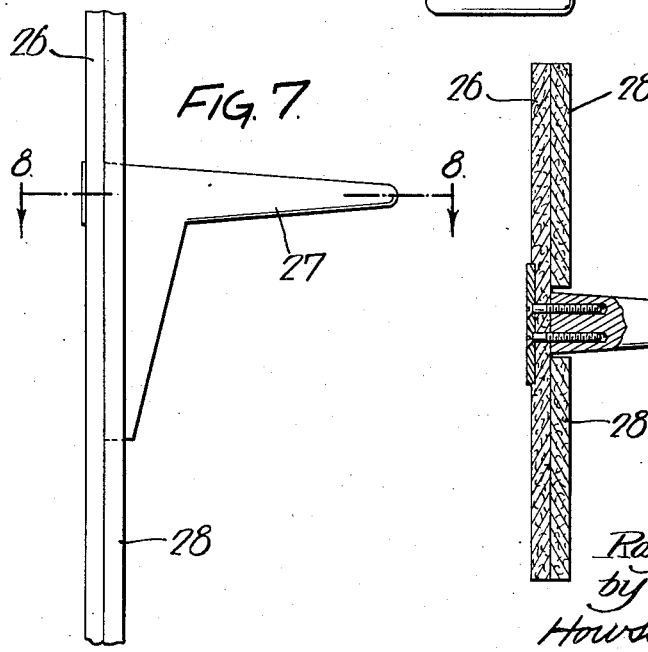
Fig. 7 is an enlarged fragmentary elevational view showing certain details of the construction of the trash removing device.
Figure 8:
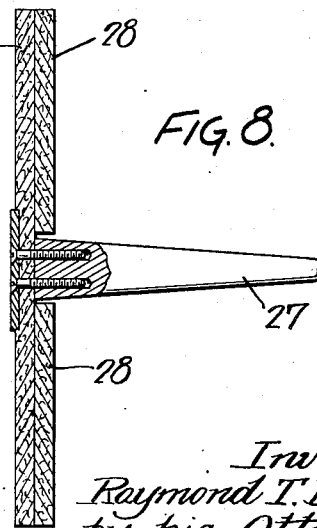
Fig. 8 is a sectional view taken on line 8—8, Fig. 7.

Extending about and between the pulleys 24 and 25 is an endless conveyor 26, for example, of rubberized fabric or similar material, and secured to this endless conveyor 26 at uniformly spaced points lengthwise along the median line thereof is a plurality of projecting elements or spikes 27 constructed and mounted, for example, as shown in Figs. 4, 7 and 8 of the drawings. The projecting elements or spikes 27 are secured to the outer surface of the conveyor 26 so that in the upward course of travel of the latter said spikes 27 project a major portion of their length into the tank 1 through the vertical slot or opening 3 therein. Thus, as the series of spikes 27 on the belt 26 move upwardly through the outer layer of paper stock undergoing treatment in the tank 1, rags and like articles in the stock are engaged and picked up by the spikes 27 and conveyed thereby upwardly and out of the tank and thence upwardly and over the upper pulley 24 where the rags and similar foreign articles are removed from the spikes 27.

In the present embodiment of the invention, rags and similar trash articles are removed or stripped from the spikes 27 automatically as the conveyor 26 continues its travel by a pair of stripper belts 28, 28. These stripper belts 28 overlie the spike conveyor 26 during travel thereof about the lower pulley 25 and thence through its vertical upward course and about the upper pulley 24. The stripper belts 28 have a combined width less than the width of the spike conveyor 26 and are arranged on the spike conveyor 26 so as to provide a space or opening between said stripper belts 28 outwardly through which the several spikes 27 may project, for example, as shown in Figs. 4 and 5 of the drawings.

As the stripper belts 28 and the spike conveyor 26 pass over the top of the upper pulley 24 and the spike conveyor 26 commences its downward course of travel, the stripper belts 28 leave the spike belt 26 and move in a generally lateral direction to and about an upper idler pulley 29. By this construction and arrangement of the belts it will be observed that as the spike conveyor 26 commences its downward course of travel at the upper pulley 24 the successive spikes 27 carried thereby are caused to pass downwardly between the relatively spaced stripper belts 28 so that the latter act to strip or remove from the successive spikes 27 any rags and similar foreign articles thereon. In addition to stripping rags and like articles from the spikes 27, the belts 28 serve to convey the stripped rags outwardly over the idler pulley 29 and deposit them onto a declining chute 30 by means of which they may be discharged into a suitable trash receptacle.

After passing about the upper idler pulley 29 the stripper belts 28 pass inwardly about a lower idler pulley 31 and thence again into contact with the spike conveyor 26 as the latter commences its travel about the lower pulley 25. Substantially midway along the downward course of the spike conveyor 26 relatively spaced fixed guide members 32 are provided as shown in Figs. 4 and 5 of the drawings for the purpose of guiding the projecting spikes 27 on the conveyor 26 properly into registry with and through the space provided therefor between the stripper belts 28.

The shaft 34 of the upper idler pulley 29 is mounted for adjustment in a horizontal direction within the limits provided by a slot 33 in the side walls 5 of the housing 4 and, as in the case of the upper pulley shaft 14, the opposite ends of its shaft 34 are journaled in bearings 35 which are mounted for horizontal sliding movement in guides 36, the desired adjustment being effected by means of jack-screws 37 connected to the bearings 35 and threaded through cross-heads 38 which bridge the outer ends of the bearing guides 36. Adjustment of the pulleys 14 and 29 is for the purpose of taking up any slack which may develop in the spike conveyor 26 or the stripper belts 28, as the case may be.

Another embodiment of the present invention is illustrated in Figs. 9 to 16 of the drawings wherein removal or discharge of the rags from the spikes is effected solely by change in the direction of travel of the spike conveyor. With reference to Figs. 9, 10 and 11 of the drawings the rag removing device is shown in conjunction with paper stock treating apparatus of the type shown and described in the aforesaid patent application and comprising a tank 41 having its side walls constituted of a plurality of upwardly extending concave lobes 42 arranged uniformly about the axis of the tank 41, for example, as indicated in Fig. 11.

In accordance with the present invention there is provided in the pulper tank 41 a vertical slot or opening 43 which extends entirely from the bottom of the tank to the top thereof and is located adjacent the junction between two lobes of the tank in advance of said junction with respect to the general direction of flow of the paper stock being treated in the tank.

Secured outwardly adjacent the tank 41 and communicating with the interior through the vertical opening 43 is a housing structure, generally designated 44, in which is contained the rag removing mechanism of the present invention. The housing 44 comprises vertically extending relatively spaced parallel side walls 45 and front and rear walls 46 and 47, respectively. The side walls 45 are secured to the wall of the tank 41, as indicated at 48 in Fig. 15, at opposite sides of the vertical slot or opening 43 therein thus providing a vertical enclosure for the rag removing mechanism outwardly adjacent the opening 43 in the tank 41.

Rags and like articles in the paper stock undergoing treatment in the tank 41 are removed therefrom by a plurality of spikes 51 carried by a spike conveyor 52. The spike conveyor 52 is positioned interiorly of the housing 44 and arranged so that the spikes 51 extend outwardly through a slot 53 in the front housing wall 46 and into the tank 41 during their upward travel. During their downward run the spikes 51 are positioned interiorly of a rearward extension 47a on the rear wall 47.

With reference to Fig. 12 of the drawings the spike conveyor of the present embodiment is driven by a pair of sprockets 54 mounted on a shaft 55 extending transversely of the upper rear corner of the housing 44. The shaft 55 is rotatably mounted in bearings 56 secured in vertical slots 57 provided in the side walls 45. Vertical adjustment of the bearings 56 in the slots 57 to adjust the position of the shaft 55 is accomplished by means of jack screws 58 which are connected to the bearings 56 and threaded in brackets 59 secured to the side walls at the lower ends of the slots 57.

The shaft 55 is adapted to be rotationally driven in the counterclockwise direction with respect to Fig. 12 and for this purpose there is secured on one end of the shaft 55 a sprocket wheel 61 which is rotationally driven by means of a chain 62 from a smaller sprocket 63 on an electric motor 64. The spike conveyor 52 passes over the sprockets 54 and vertically downward along the rear surface of the housing 44. Extending transversely of the housing 44 at the lower end thereof is a generally semi-circular wear plate 65 about which the spike conveyor 52 passes and then starts its upward travel with the spikes 51 extending into the tank 41 in order to remove rags and like articles therefrom. Extending vertically upward from the wear plate 65 are front and rear internal wall members 66 and 67 respectively which provide an enclosed chamber internally of the housing 44 thus preventing an excess amount of paper stock from entering the housing 44. In addition the walls 66 and 67 provide a surface for the conveyor 52 to ride on and also serve to maintain the spikes 51 in a horizontal position during their vertical upward travel.

Secured to the side walls 45 of the housing 44 are three pairs of sprockets 68, 69 and 70 about which the spike conveyor 52 passes after the spikes 51 are withdrawn from the tank 41. The sprockets 68, 69 and 70 are so arranged that the spike conveyor travels angularly upward during its run between the first two pairs of sprockets 68 and 69 and then angularly downward during its run between the second and third pair of sprockets 69 and 70 as illustrated in Fig. 12 with the spikes extending in a downward direction so that the rags and other materials are caused to drop or fall from the spikes 51 and onto a chute 71. During the angular upward and downward travel of the spike conveyor 52 the conveyor is additionally supported by a friction plate 72 as shown in Figs. 12 and 16 which prevents relative twisting of the spikes 51 with respect to the conveyor 52.

While a particular embodiment of the invention has been illustrated and described herein, it is not intended to limit the invention to such disclosures, and changes and modifications may be made therein and thereto within the scope of the following claims.

I claim:

1. In stock pulping apparatus comprising a tank having a side wall provided with a vertical opening therein extending substantially the full height of the tank, rag removing mechanism comprising a housing disposed outwardly adjacent the opening in the tank wall and communicating therethrough with the interior of the tank, a spike conveyor supported in said housing and arranged so that the conveyor travels upwardly along the tank opening in spaced parallel relation therewith for a portion of its course, and a plurality of spikes secured to said conveyor at equally spaced intervals therealong and arranged to project outwardly from the conveyor into the tank through said tank opening substantially the full length thereof to pick up and remove rags and like articles from the stock.

2. In a stock pulping apparatus comprising a tank having a side wall provided with a vertical opening therein extending substantially the full height of the tank, rag removing mechanism comprising a housing disposed outwardly adjacent the opening in the tank wall and communicating therethrough with the interior of the tank, a spike conveyor supported in said housing and arranged so that the conveyor travels upwardly along the tank opening in spaced parallel relation therewith for a portion of its course, a plurality of spikes secured to said conveyor at equally spaced intervals therealong and arranged to project outwardly from the conveyor into the tank through said tank opening substantially the full length thereof to pick up and remove rags and like articles from the stock, and means adjacent the upper end of said housing operable to effect discharge of rags from the spikes.

3. In stock pulping apparatus comprising a tank having a side wall provided with a vertical opening therein extending substantially the full height of the tank, rag removing mechanism comprising a housing disposed outwardly adjacent the opening in the tank wall and communicating therethrough with the interior of the tank, a spike conveyor supported in said housing and arranged so that the conveyor travels upwardly along the tank opening in spaced parallel relation therewith for a portion of its course, a plurality of spikes secured to said conveyor at equally spaced intervals therealong and projecting outwardly from the conveyor into the tank through said tank opening substantially the full length thereof to pick up and remove rags and like articles from the stock, and means adjacent the upper end of said housing to alter the direction of travel of the spike conveyor and cause the spikes to be projected downwardly so that the rags are discharged from said spikes.

4. In stock pulping apparatus comprising a tank having a side wall provided with a vertical opening therein, rag removing apparatus comprising a spike conveyor, relatively spaced sprockets supporting said conveyor and arranged so that in a portion of its course the conveyor travels upwardly along the tank opening in spaced parallel relation therewith, a plurality of spikes secured to said conveyor projecting outwardly from the conveyor into the tank to pick up and remove rags and like articles from the stock, and other sprockets supporting said conveyor for passage in an angularly downward direction after removal from the tank opening causing the spikes to be projected downwardly to thereby discharge the rags from the spikes.

5. In stock pulping apparatus comprising a tank having a side wall provided with a vertical opening therein extending substantially the full height of the tank, rag removing mechanism comprising a conveyor mounted to travel in a portion of its course upwardly along the tank opening in spaced parallel relation therewith, a plurality of spikes secured to said conveyor at equally spaced intervals therealong and projecting outwardly from the conveyor into the tank through the tank opening for substantially the full length thereof to pick up and remove rags and like articles from the stock, vertical wall members in said housing providing surfaces on which said conveyor travels, said wall members operable to maintain said spikes in position extending interiorly of said tank, and means to alter the direction of travel of the spike conveyor and cause the spikes to be projected downwardly so that the rags are discharged from the spikes.

6. In stock pulping apparatus comprising a tank having a side wall provided with a vertical opening therein extending substantially the full height of the tank, rag removing apparatus comprising a spike conveyor, relatively spaced sprockets supporting said conveyor and arranged so that in a portion of its course the conveyor travels upwardly along th tank opening in spaced parallel relation therewith, a plurality of spikes secured to said conveyor projecting outwardly from the conveyor into the tank through the tank opening for substantially the full length thereof to pick up and remove rags and like articles from the stock, vertical wall members in said housing providing surfaces on which said conveyor travels, said wall members operable to maintain said spikes in position extending interiorly of said tank, and other sprockets supporting said conveyor for passage in an angularly downward direction after removal of the spikes from the tank opening causing the spikes to be projected downwardly to discharge the rags from the spikes.

7. In stock pulping apparatus comprising a tank having a side wall provided with a vertical opening therein, rag removing mechanism comprising a conveyor mounted to travel in a portion of its course upwardly along the tank opening, a plurality of spikes secured to said conveyor at equally spaced intervals therealong and projecting outwardly from the conveyor into the tank to pick up and remove rags and like articles from the stock, and stripper means movable with the conveyor operable at a predetermined point in the travel thereof to strip rags and other articles from the spikes.

References Cited in the file of this patent

UNITED STATES PATENTS

| Number | Name | Date |
|---|---|---|
| 1,036,475 | Evans | Aug. 20, 1912 |
| 1,180,798 | Spoon | Apr. 25, 1916 |
| 1,726,756 | Murphy | Sept. 3, 1929 |
| 1,799,457 | Cuttle et al. | Apr. 27, 1931 |
| 2,070,742 | Martindale | Feb. 16, 1937 |
| 2,265,936 | Cowles | Dec. 9, 1941 |
| 2,307,601 | Nichols | Jan. 5, 1943 |
| 2,340,511 | Cowles | Feb. 1, 1944 |